(12) United States Patent
Sheehy

(10) Patent No.: US 8,534,175 B2
(45) Date of Patent: Sep. 17, 2013

(54) GAUGE AND FRAME FOR A PORTABLE SAWMILL TO MAKE WOODEN BOX CULVERT

(76) Inventor: Errol Sheehy, Jonquiere (CA)

( * ) Notice: Subject to any disclaimer, the term of this patent is extended or adjusted under 35 U.S.C. 154(b) by 190 days.

(21) Appl. No.: 13/031,592

(22) Filed: Feb. 21, 2011

(65) Prior Publication Data

US 2011/0203702 A1    Aug. 25, 2011

(30) Foreign Application Priority Data

Feb. 24, 2010 (GB) .................................. 1003040.1

(51) Int. Cl.
*B27B 3/00* (2006.01)
*B27B 29/02* (2006.01)

(52) U.S. Cl.
USPC .................. 83/452; 144/355; 144/2.1; 269/43

(58) Field of Classification Search
USPC ............. 83/452, 471.2, 167, 488, 102.1, 109, 83/112, 113, 477.1, 485, 150, 153, 157; 144/855, 2.1, 378, 377, 357, 250.24; 269/43, 269/290
See application file for complete search history.

(56) References Cited

U.S. PATENT DOCUMENTS

| | | | |
|---|---|---|---|
| 2,373,486 A * | 4/1945 | Love | 83/713 |
| 3,786,712 A | 1/1974 | Mackin | |
| 4,068,695 A | 1/1978 | Seaman | |
| 4,353,399 A | 10/1982 | Harris | |
| 5,109,899 A | 5/1992 | Henderickson | |
| 6,038,954 A * | 3/2000 | Keener | 83/795 |
| 6,128,994 A * | 10/2000 | Phelps | 83/471.2 |
| 2010/0206436 A1 * | 8/2010 | Cordell | 144/357 |

FOREIGN PATENT DOCUMENTS

GB        1304020        1/1973

* cited by examiner

*Primary Examiner* — Ghassem Alie

(57) ABSTRACT

A gauge and frame for a portable sawmill to make wooden box culvert has a frame adapted to receive the portable sawmill, the frame includes a pair of spaced guide members. Each of the guide member includes a worm screw member adapted to linearly move a retainer member, a holding member adapted to orient the retainer member at a desired angle, and an angle selecting member adapted to move the retainer member A beam rotating member rotatably attached to the frame and located between the guide members, the beam rotating member including a support member adapted to hold wooden beams, and a handle member used for rotating the support member in a plurality of axes, such that wooden beams can be manipulated and held in desired orientations and thereby cut in chosen angles and shapes by a ribbon saw of the sawmill.

6 Claims, 8 Drawing Sheets

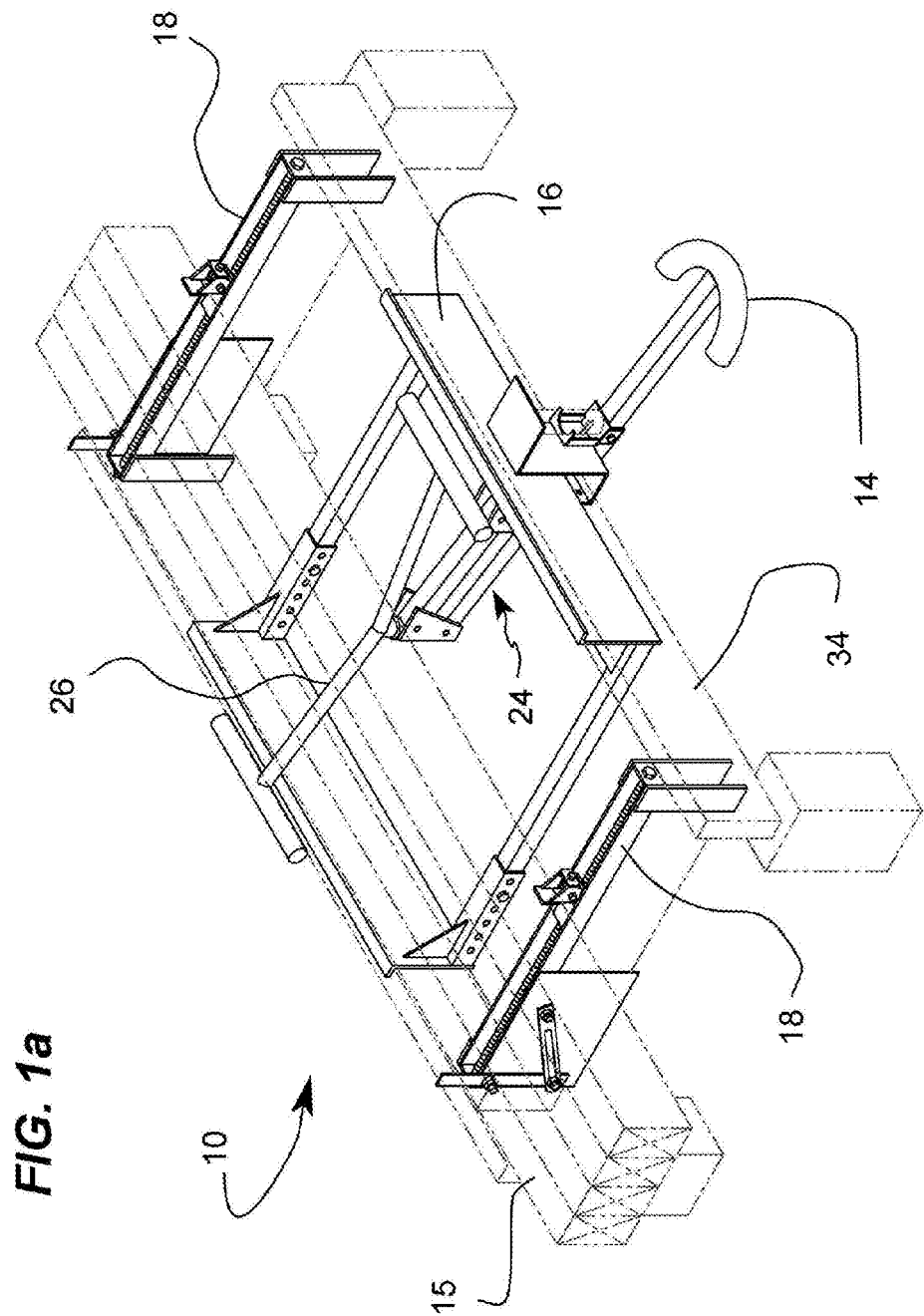

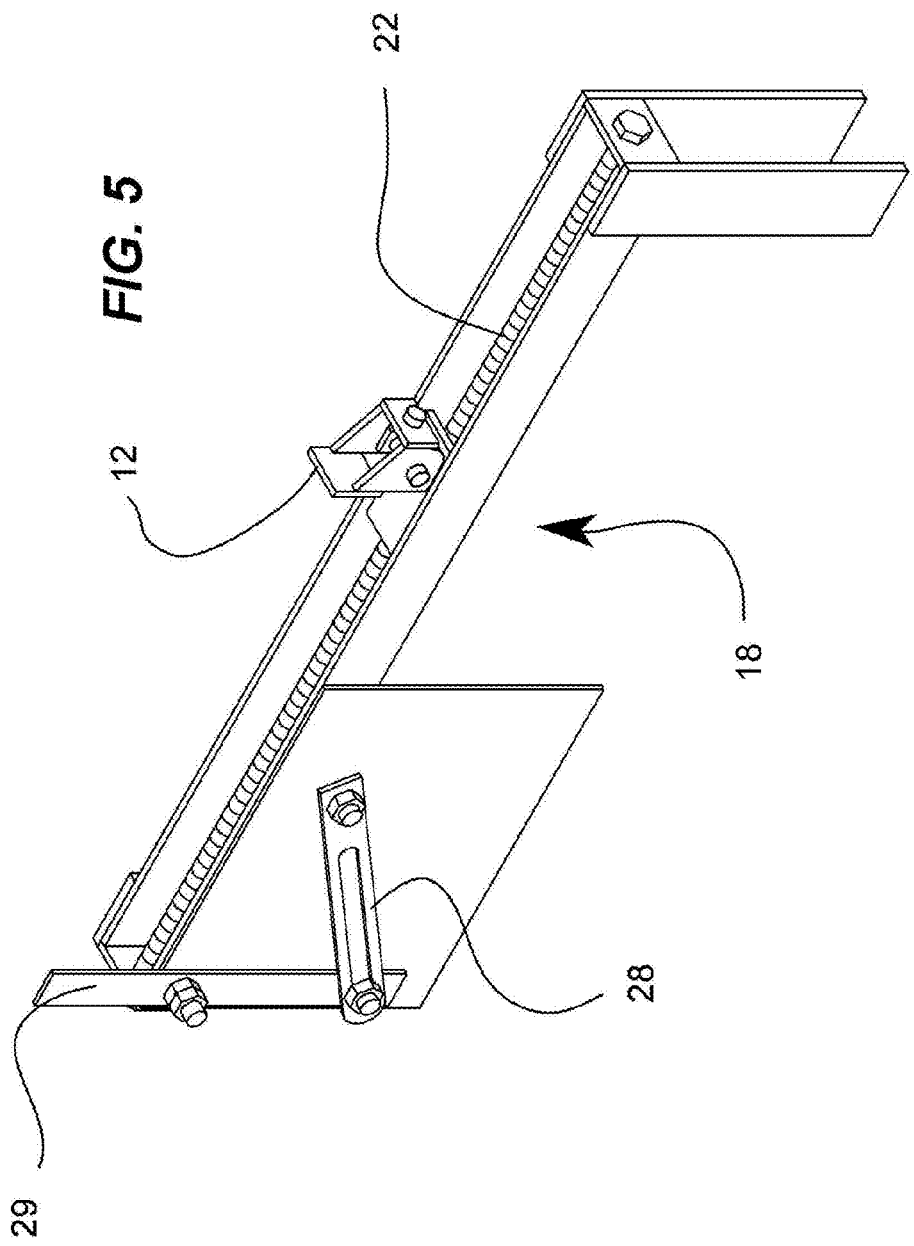

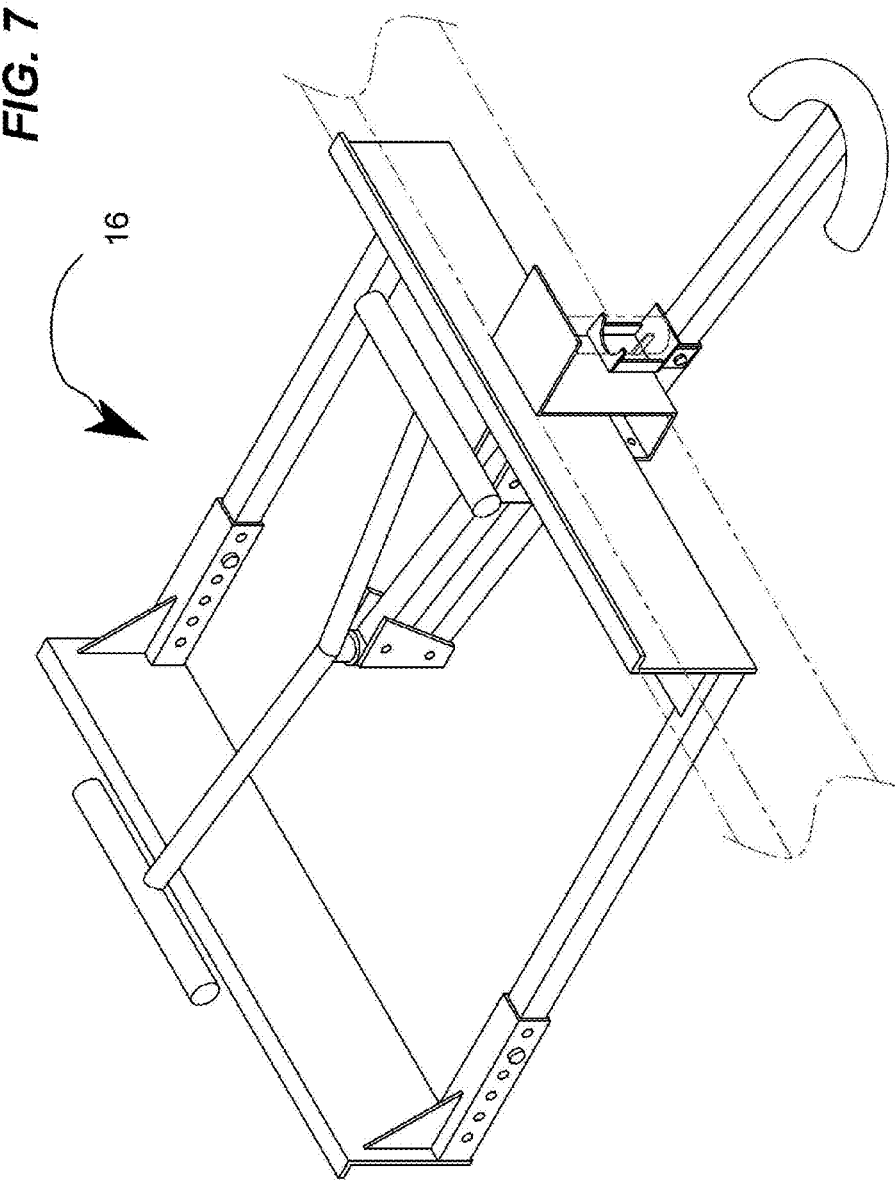

GAUGE AND FRAME FOR A PORTABLE SAWMILL TO MAKE WOODEN BOX CULVERT

FIELD OF THE INVENTION

The present invention relates generally to wood working to but more particularly to a gauge and its supporting frame used in the cutting of wooden box culvert.

BACKGROUND OF THE INVENTION

When it comes to building little bridges over trenches a culvert is usually used so as not to impede the flow of water, whether the flow is permanent or occasional, as per after a rainfall. Culverts re made of various materials. The Most Popular are made of galvanized steel, plastics, and concrete. In centuries past, and still to this day, pieces of lumber were used to create culverts. They are usually fashioned in a way that is similar to the way barrels are made. What is difficult to achieve is the proper cutting angle which will give proper diameter. Also the angle from one piece of lumber must match the angle from the other piece of lumber connected to it.

There does not exist a device that can easily cut the pieces of lumber. There is therefore a need to for a faster, more convenient, and foolproof way of cutting pieces of lumber to the proper angle so as to obtain the proper sized cylindrical shape.

SUMMARY OF THE INVENTION

In view of the foregoing disadvantages, the present invention, which will be described subsequently in greater detail, is to provide objects and advantages which are:

To provide for a practical and easy to use a gauge in conjunction with a portable sawmill so as to create a cylindrical shape. To do so, the pieces of lumber have to have two of their opposite sides cut at converging angles so that one face is wider than its opposite face so that when all pieces of lumber are connected they form a curved surface which creates a circle or cylinder.

In order to cut the pieces of lumber accordingly, the invention has a frame adapted to receive the portable sawmill, the frame including a pair of spaced guide members; each the guide member includes a worm screw member adapted to linearly move a retainer member, a holding member adapted to orient the retainer member at a desired angle, and an angle selecting member adapted to move the retainer member; a beam rotating member rotatably attached to the frame and located between the guide members, the beam rotating member including a support member adapted to hold wooden beams, and a handle member used for rotating the support member in a plurality of axes, such that wooden beams can be manipulated and held in desired orientations and thereby cut in chosen angles and shapes by a ribbon saw of the sawmill.

The gauge has its the support member include two arm members, each the arm member including a distal cross member adapted to engage an under surface of a plurality of the beam members, such that the beam members can be moved and rotated into a plurality of desired positions for cutting.

The gauge has the support member include a rotating member adapted to engage an under surface of a round log member, such that the log member can be moved and rotated into a plurality of desired positions for cutting.

As a combination of a portable sawmill and a gauge, the combination has a portable sawmill include a sawmill support structure, and a ribbon saw. A gauge comprising a frame adapted to receive the portable sawmill, the frame including a pair of spaced guide members. Each guide member includes a worm screw member adapted to linearly move a retainer member, a holding member adapted to orient the retainer member at a desired angle, and an angle selecting member adapted to move the retainer member; a beam rotating member rotatably attached to the frame and located between the guide members, the beam rotating member including a support member adapted to hold wooden beams, and a handle member used for rotating the support member in a plurality of axes, such that wooden beams can be manipulated and held in desired orientations and thereby cut in chosen angles and shapes by a ribbon saw of the sawmill.

The invention results in a method of making a wooden box culvert which comprises the following steps:
 a.) Providing a portable sawmill including a sawmill support structure, and a ribbon saw.
 b.) Providing a gauge comprising a frame adapted to receive the portable sawmill, the frame including a pair of spaced guide members; each the guide member includes a worm screw member adapted to linearly move a retainer member, a holding member adapted to orient the retainer member at a desired angle, and an angle selecting member adapted to move the retainer member; a beam rotating member rotatably attached to the frame and located between the guide members, the beam rotating member including a support member adapted to hold wooden beams, and a handle member used for rotating the support member in a plurality of axes, such that wooden beams can be manipulated and held in desired orientations and thereby cut in chosen angles and shapes by a ribbon saw of the sawmill.
 c.) Providing a plurality of wooden beam members.
 d.) Placing a plurality of the wooden beam members across the top surface of both the guide members.
 e.) Using the beam rotating member to engage and orient the wooden beam members at a desired position and orientation with respect to the ribbon saw.
 f.) Cutting the wooden beam members in the angles and desired shapes.
 g.) Connecting the wooden beam members in a side by side fashion to form the wooden box culvert.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIGS. 1a-b Exploded views of the invention with beams and with a log.

FIG. 5 Isometric view of the gauge.

FIG. 7 Isometric view of the frame.

DETAILED DESCRIPTION OF THE PREFERRED EMBODIMENT

Figure 6:
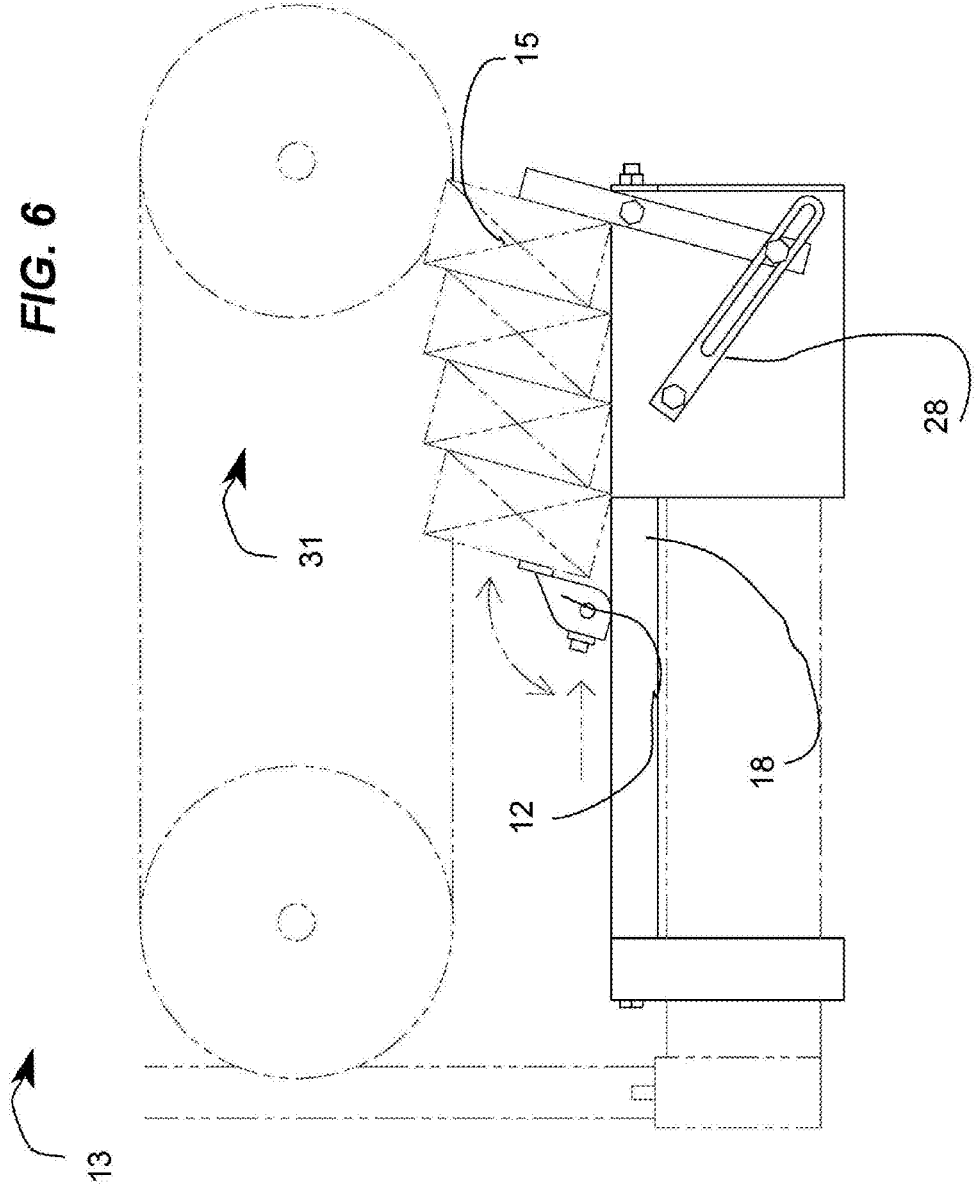
FIG. 6 Side view of the invention in context.

A gauge (10) for a portable sawmill (13) to make wooden box culvert (11) has a frame (16) capable of receiving the portable sawmill (13). The portable sawmill consists primarily in a ribbon saw (31), as seen in FIG. 6, the general idea is for the gauge (10) to be able to cut pieces of lumber, or beam (15) lengthwise and at an angle.

Figures 2A, 2B:
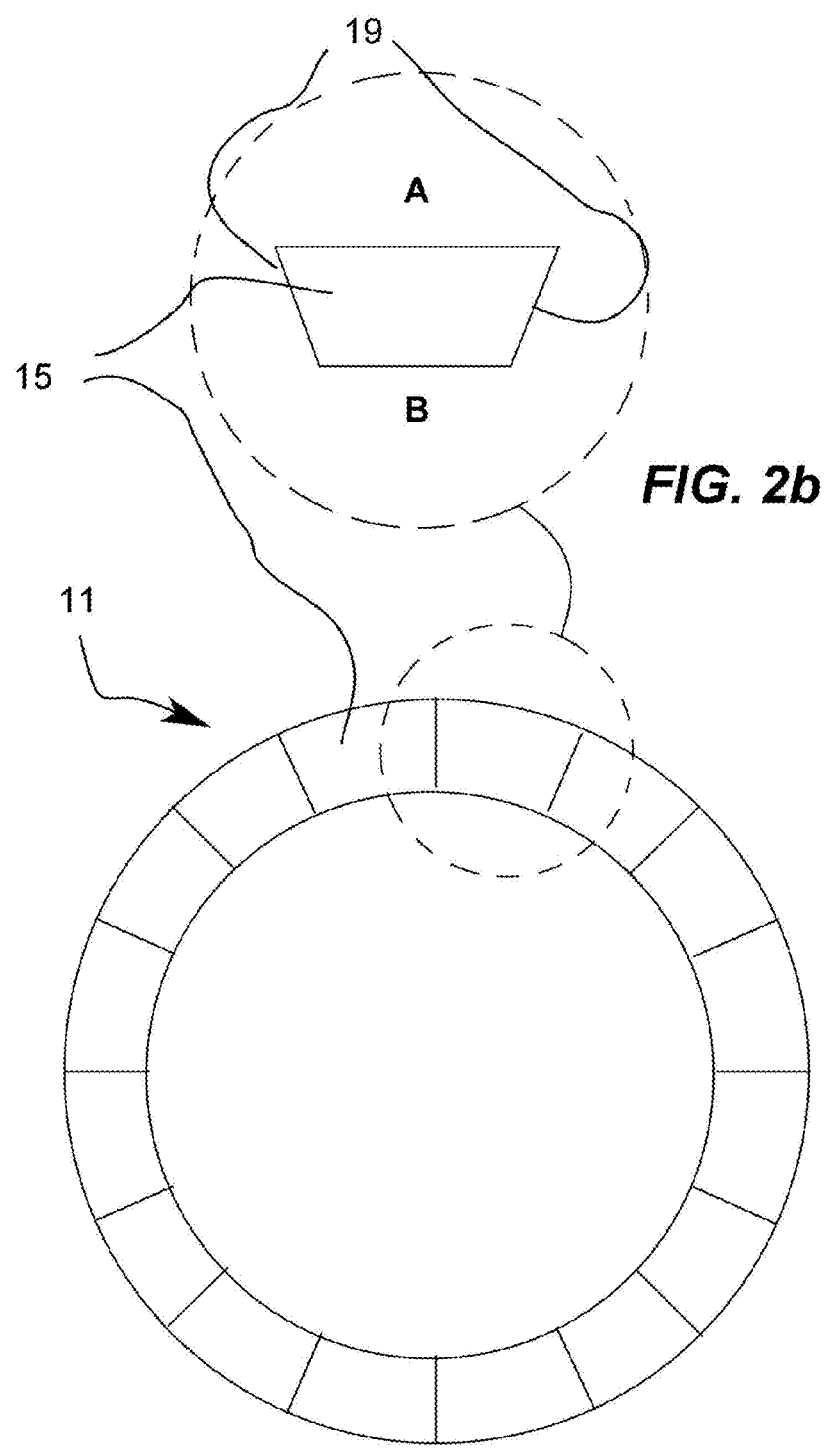
FIGS. 2a-b Front view and detail view, respectively, of a culvert.

In order to cut the beams (15) cut at the right angles, they have to have two of their opposite sides cut at converging angles so that one face is wider than its opposite face. For example, FIG. 2a shows a culvert (11) having a plurality of beams (15) disposed in a circular fashion. FIG. 2b shows one such beam (15) wherein face "A" is wider than face "B" because two sides (19) have been cut at diverging angles. When cut in such a way, when all the beams (15) are connected, they form a curved surface which creates a circle or cylinder as per FIG. 2a.

In order to cut the sides (19) The frame (16) has a pair of spaced guide members (18) to orient each beam (15) being cut. Each guide member (18) includes a worm screw member (22) linearly moving an orientable retainer member (12). The orientation of the retainer (12) follows the orientation of a holding member (29) which is itself moved by way of an angle selecting member (28). The ribbon saw (31) then cuts the beam(s) (15) at the desired angle, as shown in FIG. 6, for example.

Figure 3A:
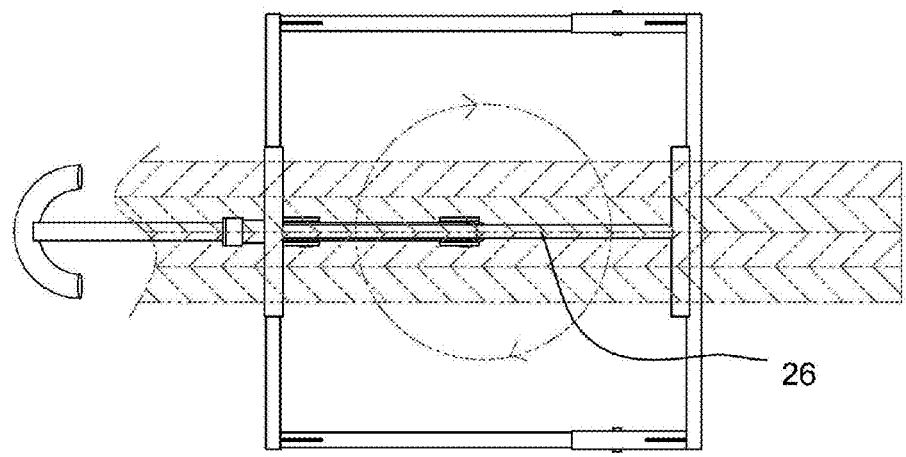
FIGS. 3a-b top and side views, respectively, of the invention with beams.
Figure 3B:
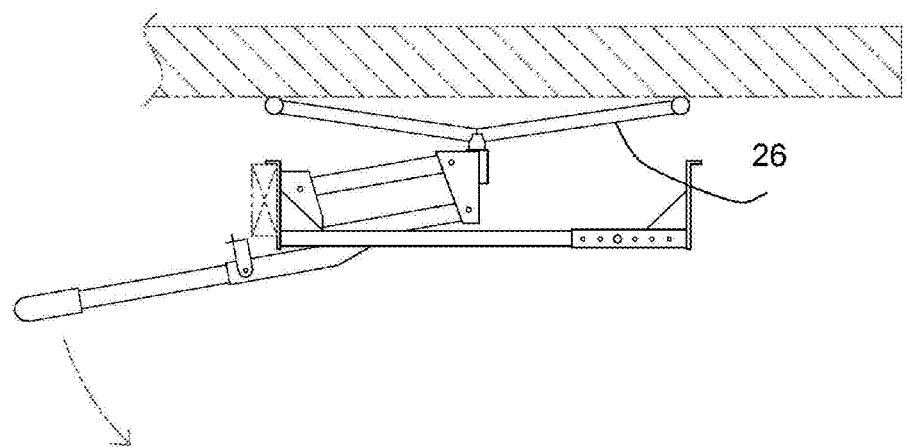
Figure 4A:
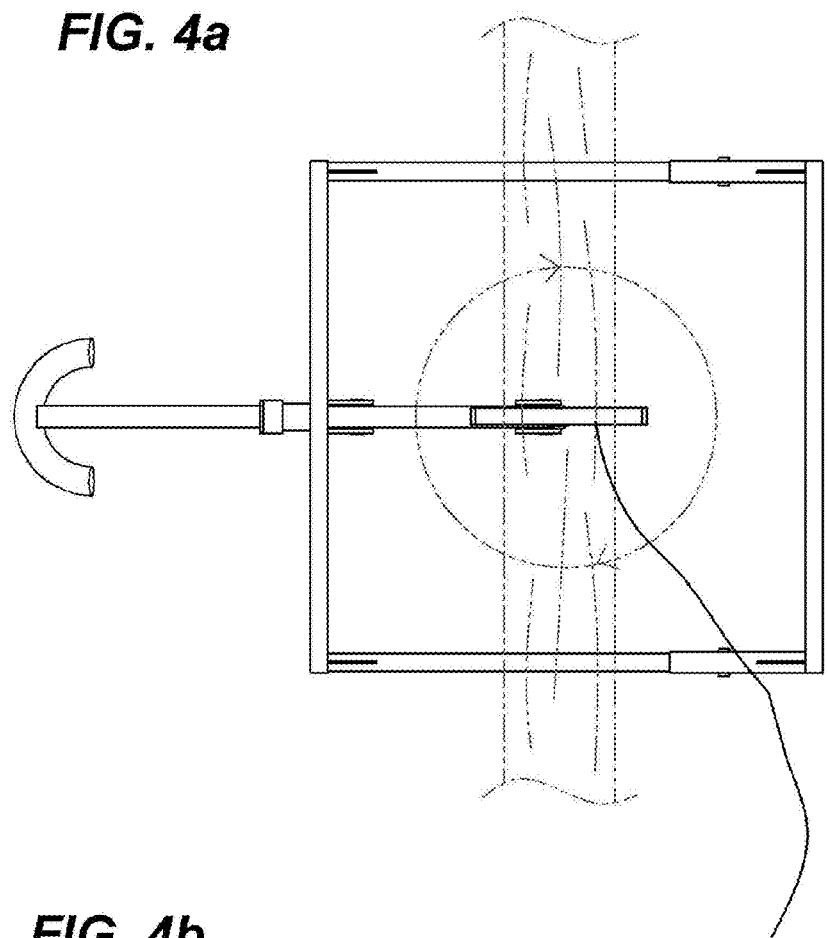
FIGS. 4a-b top and side views, respectively, of the invention with a log.
Figure 4B:
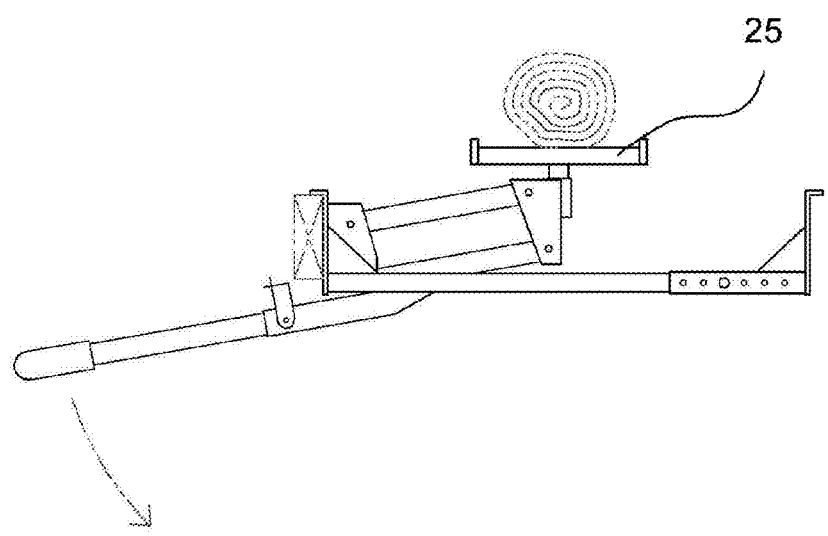

A beam rotating member (24) includes a structural member held on a support member (26). the beam rotating member (24) rotates one or more beams (15) as shown by arrows in FIG. 3a.

A handle member (14) lifts the support member (26). The combination support member (26) and handle member (14) cooperate as a mechanical articulations in a fashion which is quite common and need not be further discussed herein.

Figure 1B:
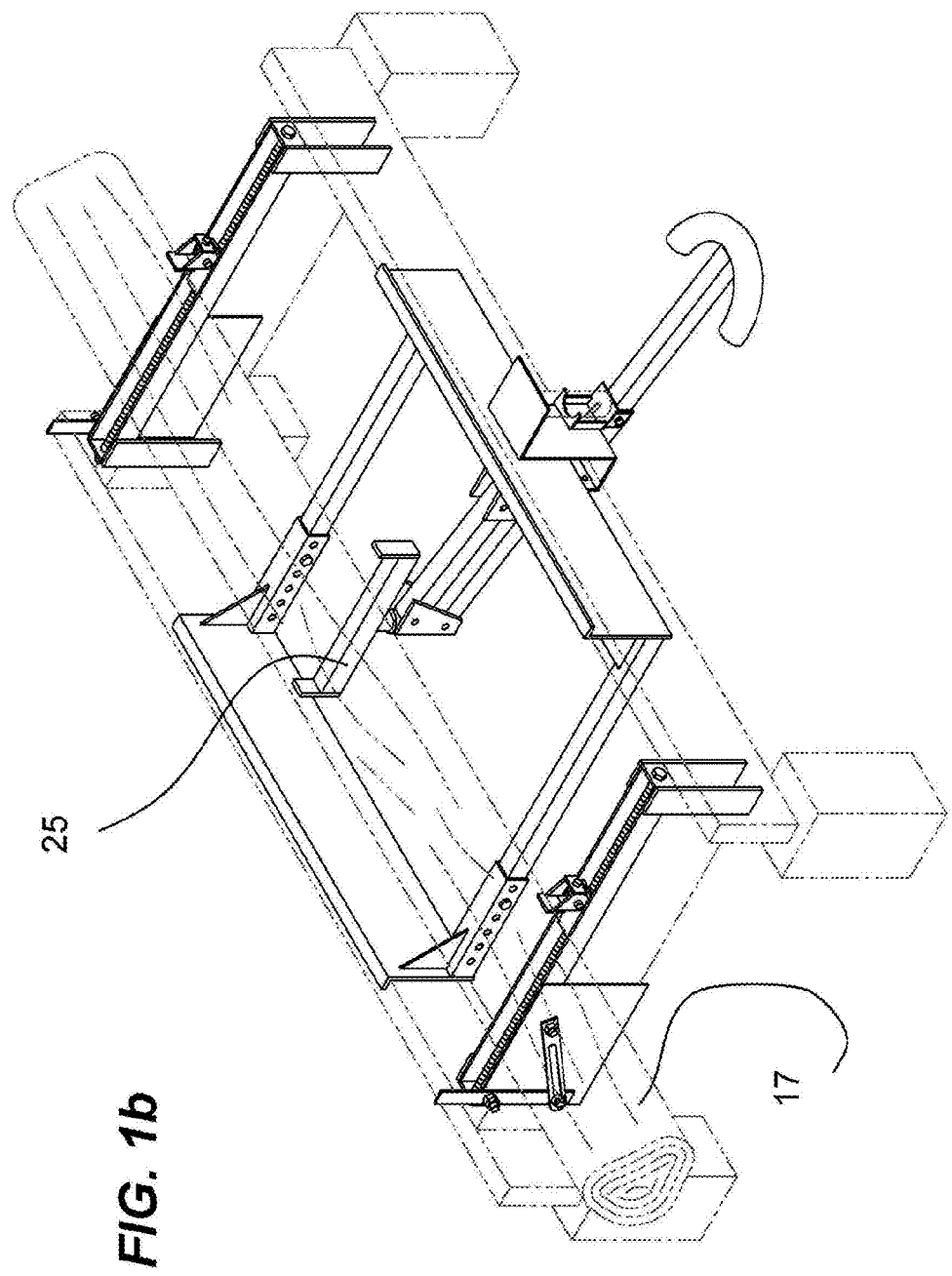

As can be seen in FIG. 1b, a log (17) can be installed on a compact rotating member (25). In this manner, the fabrication process can start from a log (17) which will become a plurality of beams (15).

The frame (16) and the guides (18) rest on top of a support structure (34) which, along with the ribbon saw (31), defines the portable sawmill (13).

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A gauge for a portable sawmill comprising a frame adapted to receive said portable sawmill, said frame defining a flat plane and including a pair of spaced guide members; each said guide member includes a worm screw member adapted to linearly move a retainer member, a holding member adapted to orient said retainer member at a desired angle, and an angle selecting member adapted to move said retainer member in unison therewith, such that any change in angle of said angle selecting member is correlated to a change of angle of said retainer member; a beam rotating member rotatably attached to said frame and located between said guide members, said beam rotating member including a support member adapted to hold wooden beams, and a handle member adapted for rotating the support member on an axis perpendicular to said flat plane, such that wooden beams can be manipulated and held in desired orientations and thereby cut in chosen angles and shapes by a ribbon saw of said sawmill.

2. The gauge of claim 1, wherein said support member includes two arm members, each said arm member including a distal cross member adapted to engage an under surface of a plurality of said beam members, such that said beam members can be moved and rotated into a plurality of desired positions for cutting.

3. The gauge of claim 1, wherein said support member includes a rotating member adapted to engage an under surface of a round log member, such that said log member can be moved and rotated into a plurality of desired positions for cutting.

4. A combination of a portable sawmill and a gauge, said combination comprising a portable sawmill including a sawmill support structure, and a ribbon saw; and a gauge comprising a frame adapted to receive said portable sawmill, said frame defining a flat plane and including a pair of spaced guide members; each said guide member includes a worm screw member adapted to linearly move a retainer member, a holding member adapted to orient said retainer member at a desired angle, and an angle selecting member adapted to move said retainer member in unison therewith, such that any change in angle of said angle selecting member is correlated to a change of angle of said retainer member; a beam rotating member rotatably attached to said frame and located between said guide members, said beam rotating member including a support member adapted to hold wooden beams, and a handle member adapted for rotating the support member on an axis perpendicular to said flat plane, such that wooden beams can be manipulated and held in desired orientations and thereby cut in chosen angles and shapes by a ribbon saw of said sawmill.

5. The gauge of claim 4, wherein said support member includes two arm members, each said arm member including a distal cross member adapted to engage an under surface of a plurality of said beam members, such that said beam members can be moved and rotated into a plurality of desired positions for cutting.

6. The gauge of claim 4, wherein said support member includes a rotating member adapted to engage an under surface of a round log member, such that said log member can be moved and rotated into a plurality of desired positions for cutting.

* * * * *